US012761036B2

(12) United States Patent
Fan et al.

(10) Patent No.: US 12,761,036 B2
(45) Date of Patent: Oct. 13, 2026

(54) NAVIGATION INTERFACE DISPLAY

(71) Applicant: Tencent Technology (Shenzhen) Company Limited, Shenzhen (CN)

(72) Inventors: Jingbo Fan, Shenzhen (CN); Qian Chen, Shenzhen (CN); Lingfang Pang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 574 days.

(21) Appl. No.: 18/201,564

(22) Filed: May 24, 2023

(65) Prior Publication Data

US 2023/0296396 A1 Sep. 21, 2023

Related U.S. Application Data

(63) Continuation of application No. PCT/CN2022/108015, filed on Jul. 26, 2022.

(30) Foreign Application Priority Data

Aug. 20, 2021 (CN) ........................ 202110959201.4

(51) Int. Cl.
*G01C 21/36* (2006.01)

(52) U.S. Cl.
CPC ....... *G01C 21/367* (2013.01); *G01C 21/3632* (2013.01); *G01C 21/3658* (2013.01)

(58) Field of Classification Search
CPC .............. G01C 21/367; G01C 21/3632; G01C 21/3658

(Continued)

(56) References Cited

U.S. PATENT DOCUMENTS

2011/0007074 A1* 1/2011 Sakashita ............. G01C 21/367 345/428
2015/0019127 A1* 1/2015 Pritchard ............. G01C 21/367 701/423

(Continued)

FOREIGN PATENT DOCUMENTS

CN 101852619 A 10/2010
CN 110514219 A 11/2019

(Continued)

OTHER PUBLICATIONS

International Search Report and Written Opinion received for PCT Patent Application No. PCT/CN2022/108015, mailed on Sep. 30, 2022, 10 pages.

*Primary Examiner* — Hitesh Patel
*Assistant Examiner* — John D Holman
(74) *Attorney, Agent, or Firm* — ARENTFOX SCHIFF LLP

(57) ABSTRACT

In a method of a display of a navigation interface, a representative model of a vehicle is displaced in an identity display region of the navigation interface. The identity display region indicates a view focus region of a user in the navigation interface of a terminal located inside the vehicle. The representative model is displayed on an electronic map on the navigation interface. A display position of the representative model is adjusted in the identity display region based on a change of a traveling state of the vehicle. A display configuration of the electronic map is updated in the navigation interface based on the adjusted display position of the representative model in the identity display region.

20 Claims, 10 Drawing Sheets

(58) Field of Classification Search
USPC .......................................................... 701/437
See application file for complete search history.

(56) References Cited

U.S. PATENT DOCUMENTS

| | | | | |
|---|---|---|---|---|
| 2021/0381846 A1* | 12/2021 | Chang | ................ | G01C 21/3635 |
| 2022/0026231 A1* | 1/2022 | Li | ...................... | G01C 21/3632 |
| 2022/0116574 A1* | 4/2022 | Kakimaru | .............. | B60K 35/29 |
| 2023/0168102 A1* | 6/2023 | Kim | ................... | G01C 21/3647<br>701/437 |

FOREIGN PATENT DOCUMENTS

| | | |
|---|---|---|
| CN | 110779541 A | 2/2020 |
| CN | 112710325 A | 4/2021 |
| CN | 113590070 A | 11/2021 |

* cited by examiner

NAVIGATION INTERFACE DISPLAY

RELATED APPLICATIONS

The present application is a continuation of International Application No. PCT/CN2022/108015, entitled "NAVIGATION INTERFACE DISPLAY METHOD AND APPARATUS, TERMINAL, AND STORAGE MEDIUM" and filed on Jul. 26, 2022, which claims priority to Chinese Patent Application No. 202110959201.4, entitled NAVIGATION INTERFACE DISPLAY METHOD AND APPARATUS, TERMINAL, AND STORAGE MEDIUM filed on Aug. 20, 2021. The entire disclosures of the prior applications are hereby incorporated by reference in their entirety.

FIELD OF THE TECHNOLOGY

Embodiments of this disclosure relate to the technical field of Internet of Vehicles, including a display of a navigation interface.

BACKGROUND OF THE DISCLOSURE

At present, online navigation functions are widely used. For example, online car-hailing application software, navigation application software, map application software, and the like provide vehicle traveling navigation functions.

In the related art, a terminal displays a map within a certain range around a user through a navigation interface, indicates a current position of a vehicle driven by the user through a vehicle identity, controls the vehicle identity to move in the map of the navigation interface according to a position change of the vehicle, and reflects a driving route of the vehicle in real time.

However, a display mode of the navigation interface in the related art causes a large movement range of the vehicle identity in the navigation interface. Especially when driving a vehicle, it is difficult for a user to quickly and accurately determine the position of a vehicle identity in the map through one glance. That is, multiple or long-term observations may be applied to determine the current position of the vehicle and a subsequent traveling route, thus affecting driving safety.

SUMMARY

Embodiments of this application provide a navigation interface display method and apparatus, a terminal, and a non-transitory computer-readable storage medium. The technical solutions can be shown as follows:

According to an aspect, a method of a display of a navigation interface is provided. In the method, a representative model of a vehicle is displaced in an identity display region of the navigation interface. The identity display region indicates a view focus region of a user in the navigation interface of a terminal located inside the vehicle. The representative model is displayed on an electronic map on the navigation interface. A display position of the representative model is adjusted in the identity display region based on a change of a traveling state of the vehicle. A display configuration of the electronic map is updated in the navigation interface based on the adjusted display position of the representative model in the identity display region.

According to another aspect of the disclosure, an apparatus is provided. The apparatus includes processing circuitry. The processing circuitry can be configured to perform any of the described methods of a display of a navigation interface.

Aspects of the disclosure also provide a non-transitory computer-readable medium storing instructions which when executed by a computer for video decoding cause the computer to perform any of the described methods of a display of a navigation interface.

The technical solutions provided in the embodiments of this disclosure can include beneficial effects as follows:

In the embodiments of this disclosure, by adjusting a display position of an object identity (e.g., a presentative model of a navigation object) and updating an electronic map, a change situation of a traveling state is shown. In addition, before and after the object identity is adjusted, the object identity is located in an identity display region. Accordingly, the object identity is displayed in the identity display region regardless of the traveling state, and a display region of the object identity is limited. While showing the change situation of the traveling state, it can be ensured that a user determines the current position and a subsequent traveling route through a quick glance during the driving process. Thus, the efficiency of the user is increased in determining the position and viewing a navigation route, and the safety of driving is ensured.

DESCRIPTION OF EMBODIMENTS

In the related art, a terminal displays a map within a certain range around a user through a navigation interface, indicates a current position of a vehicle driven by the user through a vehicle identity, controls the vehicle identity to move in the map of the navigation interface according to a position change of the vehicle, and reflects a driving route of the vehicle in real time.

Figure 1:
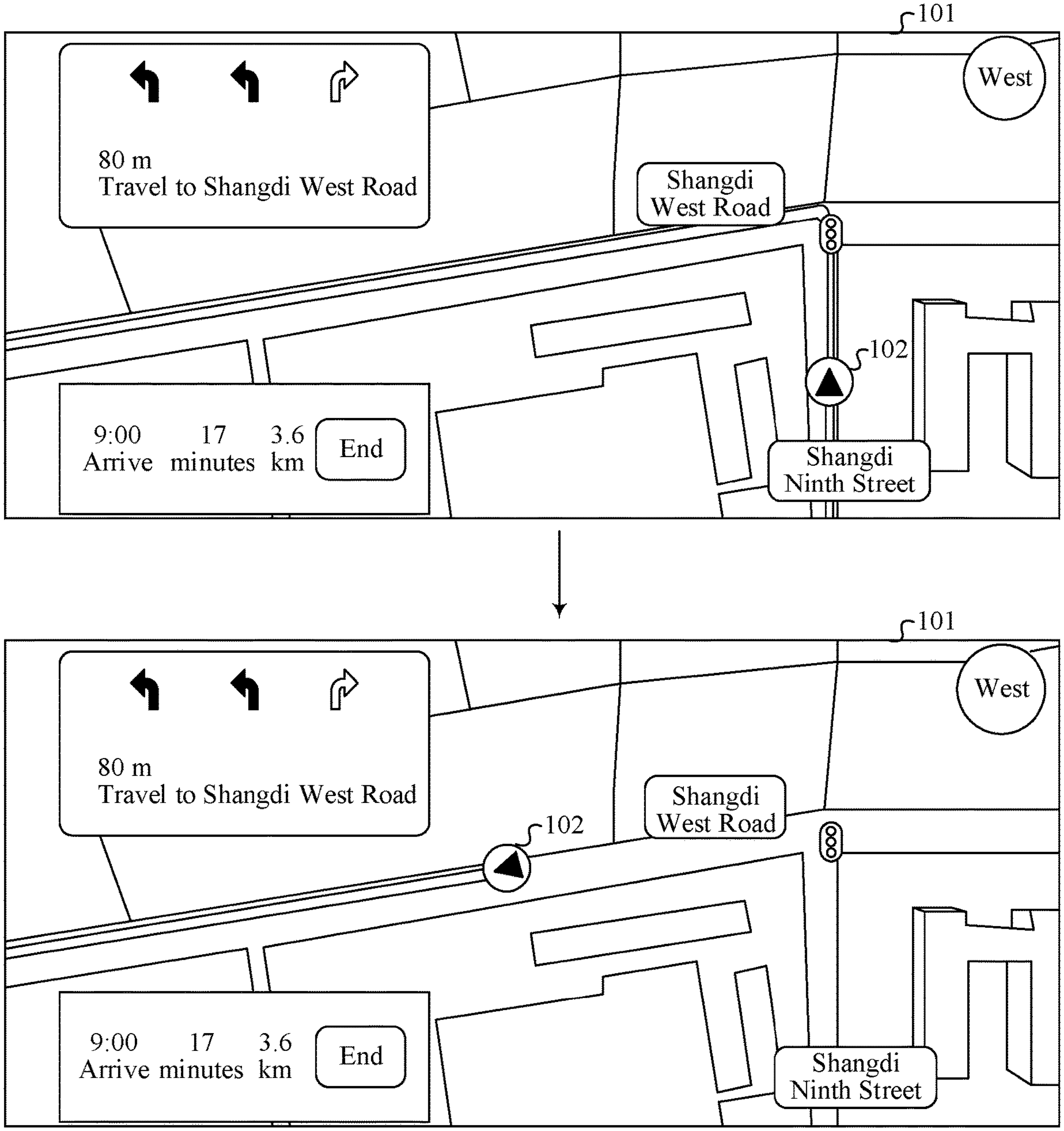
FIG. 1 is a schematic diagram of a navigation interface in the related art.

However, a display mode of the navigation interface in the related art causes a large movement range of the vehicle identity in the navigation interface. Especially when driving a vehicle, it is difficult for a user to quickly and accurately determine the position of a vehicle identity in the map through one glance. That is, multiple or long-term observations may be applied to determine the current position of the vehicle and a subsequent traveling route, thus affecting driving safety. As shown in FIG. 1, a navigation interface 101 displays a map and an object identity 102. In an embodiment, the object identity 102 can be a representative model (e.g., a three-dimensional model or a two-dimensional model) of a navigation object. The navigation object can be an object to be navigated, such as a user who enables the navigation function and/or a vehicle driven by the user. A terminal controls the movement of the object identity 102 in the navigation interface in real time based on a position change situation of a navigation object. If a user does not view the navigation interface for a long period of time, the position of the object identity 102 may differ greatly when viewing the navigation interface for two consecutive times, and the user cannot quickly determine the position of the object identity 102 in the navigation interface. In addition, when a traveling direction of a vehicle changes (for example, turning or U-turning), the object identity or the map largely changes in accordance with the change in the traveling direction, which tends to make the user feel dizzy.

In order to solve the foregoing technical problem, this disclosure provides a navigation interface display method. A display position of an object identity is adjusted in an identity display region, and an electronic map is updated based on the display position of the object identity. While ensuring that the object identity is displayed in a fixed visual focus region (or view focus region) in a navigation interface, the degree of change of the map is alleviated as much as possible, so that a user can quickly determine the position of a vehicle, and the feeling of dizziness caused by the change of the map when a traveling direction is changed is also reduced. The navigation interface display method according to an embodiment of this disclosure is applicable to a terminal such as a navigator, a smartphone, or a tablet personal computer. In a possible implementation, the navigation interface display method according to this embodiment of this disclosure may be implemented as an application or part of an application, and installed into the terminal, so that the terminal has positioning and navigation functions. For ease of description, the various embodiments below describe an example in which the navigation interface display method is applied to a terminal, but the various embodiments are not limited thereto.

Figure 2:
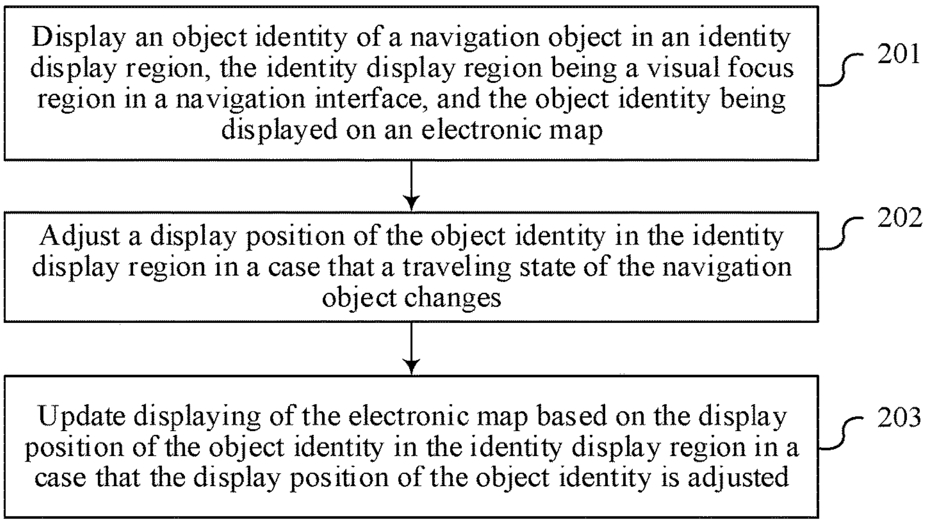
FIG. 2 is a flowchart of a navigation interface display method according to an exemplary embodiment of this disclosure.

FIG. 2 shows a flowchart of a navigation interface display method according to an exemplary embodiment of this disclosure. This embodiment describes an example in which the method is applied to a terminal having a navigation function. The method includes the following steps:

In step 201, an object identity of a navigation object is displayed in an identity display region. The identity display region is a visual focus region (or a view focus region) in a navigation interface, and the object identity is displayed on an electronic map. The visual focus region (also referred to as view focus region) indicates a field of view focus from a user when the user watches the navigation interface.

In a possible implementation, when the terminal receives an enabling operation of a navigation function, the terminal obtains current position information and displays a navigation interface based on the current position information. The navigation interface includes an electronic map and an object identity of a navigation object. The position of the object identity in the electronic map can reflect a geographical position of the navigation object. The navigation object refers to an object to be navigated, for example, a user who enables the navigation function and a vehicle driven by the user. The terminal determines the position of the terminal as the position of the navigation object.

In an example, navigation route indication information is also displayed in the electronic map of the navigation interface. The navigation route indication information is text information or graphic information, such as a guide line with an object identity as a starting point for indicating a traveling direction.

Schematically, the terminal displays the object identity at a default position in the navigation interface and displays the electronic map based on the current position information of the navigation object, thereby simulating the position and movement situation of the navigation object in a real environment based on the object identity and the electronic map.

In order that the user searches for the object identity during the navigation process, the terminal displays the object identity in an identity display region of the navigation interface. The identity display region is a fixed visual focus region. The visual focus region is a region facilitating focusing of a user sight. For example, based on behavior habits of user driving and glancing at a terminal interface, it is determined that the visual focus region is located at a right position on the navigation interface, and the distance between each boundary of the visual focus region and each boundary of the navigation interface is not less than a distance threshold. That is, the visual focus region is not at an interface corner and an interface edge, and the position of the visual focus region is fixed. Furthermore, in order to focus the user sight to enable the user to approximately determine a display position of the object identity in the navigation interface before viewing the navigation interface, the area of the visual focus region is smaller than a preset area threshold. For example, the display area of the visual focus region is $1/40$ of the display area of the navigation interface. In a possible implementation, the visual focus region (namely, the identity display region) in the navigation interface is obtained by gridding the navigation interface in advance.

The identity display region is not perceivable. That is, the user cannot perceive the presence of the identity display region in the interface through the navigation interface, and can perceive that the object identity is displayed at a fixed position.

In an example, the terminal may also provide the user with a setting function of the identity display region, whereby the user sets the identity display region where the object identity is located in the navigation interface based on navigation requirements of the user. For example, the user sets the identity display region in the center of the navigation interface. In an example, in order to prevent the user from mistakenly setting the identity display region, when the user inputs an identity display region to be set, the identity display region may also be uploaded to a background server of a navigation application, whereby the background server checks and fine-adjusts the identity display region to be set, thereby ensuring that the identity display region may meet the setting requirements.

In an example, the edge of the object identity may not extend beyond the edge of the identity display region, or the center of the object identity may not extend beyond the edge of the identity display region. This embodiment of this disclosure is not limited thereto.

Figure 3:
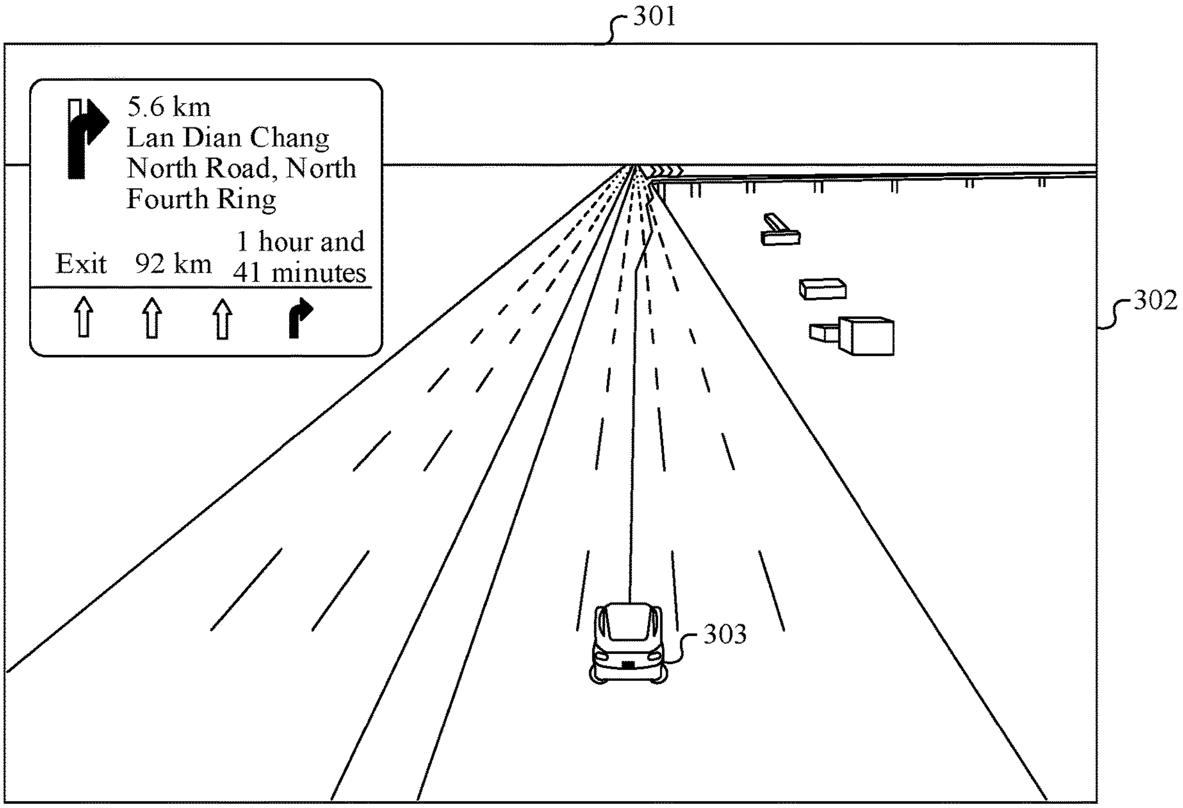
FIG. 3 is a schematic diagram of a navigation interface according to an exemplary embodiment of this disclosure.

FIG. 3 schematically shows a schematic diagram of a navigation interface. A navigation interface 301 includes an electronic map 302 and an object identity 303. When the user drives the vehicle to travel straight along a current lane, the terminal adjusts the electronic map 302 downwards and keeps the object identity 303 at a current display position.

In step 202, a display position of the object identity is adjusted in the identity display region based on a change of a traveling state of the navigation object.

In a possible implementation, when the navigation object travels straight in a current road and the traveling state does not change, the terminal displays a traveling process of the navigation object by fixing the object identity and adjusting the electronic map. For example, when the navigation object travels in the north direction in the current lane, the terminal fixes the object identity and adjusts the electronic map downwards in the navigation interface, so that the user may determine the position of the vehicle through one glance (the position of the vehicle has not changed in the navigation interface). When the traveling state of the navigation object is about to change, for example, in lane changing, turning, U-turning, entering a branch road, or the like, if the terminal displays the traveling process and a navigation route by adjusting the electronic map, the electronic map needs to be changed (moved and rotated) largely within a short time. The large change in the electronic map may make the user feel dizzy, which is not conducive to safe driving. Therefore, the terminal no longer displays the traveling process of the navigation object by simply moving the electronic map, but adjusts the display position of the object identity in the identity display region and controls the electronic map to move relatively so as to reduce and alleviate the degree of change of the electronic map as much as possible, thereby reducing the feeling of dizziness, so that the user can quickly learn how to change the traveling state through the display content of the navigation interface.

The identity display region is a small-sized and fixed visual focus region in the navigation interface. Therefore, even if the terminal adjusts the display position of the object identity, the object identity is located in the identity display region, and the user may still quickly determine the display position of the object identity without searching for the changed position of the object identity in the navigation interface. In a case that the object identity is small or the surrounding environment interferes too much, the efficiency of searching for the object identity in the navigation interface can be improved.

In an example, when the traveling state of the navigation object changes, the terminal adjusts the display position of the object identity in the identity display region, and fixes the electronic map, so as to reduce the feeling of dizziness caused by the large change in the electronic map. Or, the terminal adjusts the display position of the object identity and also adjusts displaying of the electronic map, so as to reduce the degree of change of the display position and the electronic map with respect to the navigation interface.

In step 203, a display (or display configuration) of the electronic map is updated based on the display position of the object identity in the identity display region in a case that the display position of the object identity is adjusted.

After the display position of the object identity in the identity display region is adjusted, it is indicated that the traveling state of the navigation object changes. By changing the display position of the navigation object identity in the identity display region, the change of the form state cannot be reflected. Correspondingly, the terminal also needs to update the electronic map based on the adjusted display position of the object identity, so that the change of the electronic map matches the change of the display position of the object identity to achieve a display effect that the object identity changes the traveling state along the navigation line. Since the display position of the object identity is adjusted based on the change situation of the traveling state, the change of the electronic map can be reduced, thereby avoiding that the user needs to view the navigation interface for several times or for a long time during the driving process to determine the current position and travel route due to the large change.

In summary, in this embodiment of this disclosure, by adjusting a display position of an object identity and updating an electronic map, a change situation of a traveling state is shown, and before and after the object identity is adjusted, the object identity is located in an identity display region, so that the object identity is displayed in the identity display region regardless of the traveling state, thereby limiting a display region of the object identity. While showing the change situation of the traveling state, it can be ensured that a user determines the current position and a subsequent traveling route through a quick glance during the driving process, thereby improving the efficiency of the user in determining the position and viewing a navigation route, and ensuring the safety of driving.

Figure 4:
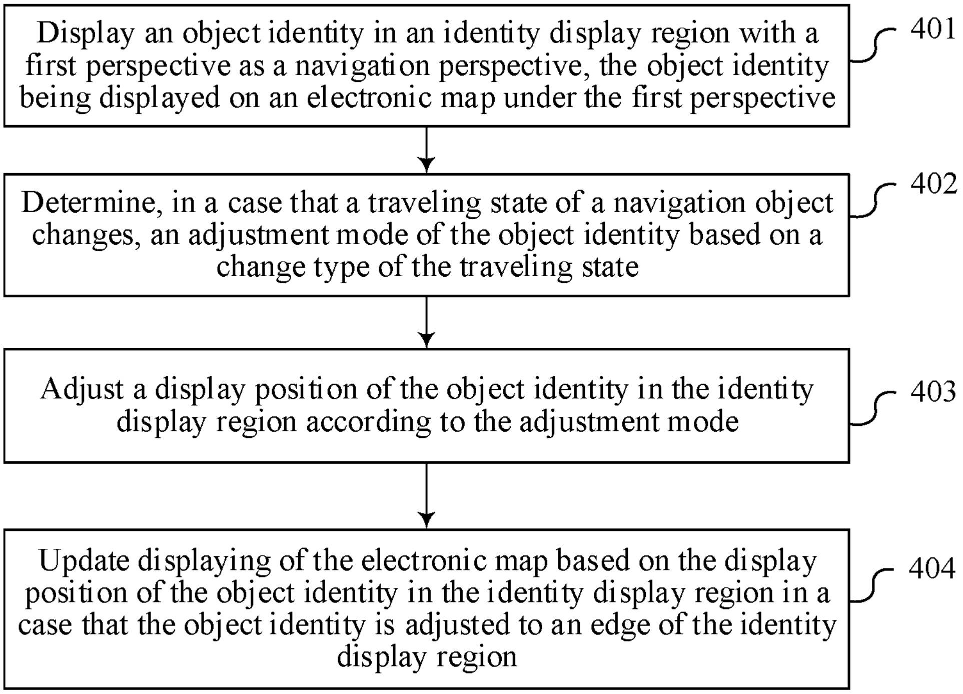
FIG. 4 is a flowchart of a navigation interface display method according to another exemplary embodiment of this disclosure.

In a possible implementation, the map in the navigation interface is a three-dimensional map, and the object identity is a three-dimensional model (for example, car model) of the navigation object. FIG. 4 shows a flowchart of a navigation interface display method according to another exemplary embodiment of this disclosure. This embodiment describes an example in which the method is applied to a terminal having a navigation function. The method includes the following steps:

In step 401, an object identity is displayed in an identity display region with a first perspective as a navigation perspective. Accordingly, the object identity is displayed on an electronic map under the first perspective.

In a possible implementation, the terminal displays the electronic map and the object identity in the first perspective by default. Schematically, the first perspective is a photographing perspective of a virtual camera. The terminal generates a three-dimensional map and an object identity of the navigation object through three-dimensional modeling, and controls the virtual camera to photograph from the rear of the object identity at a certain overhead angle, thereby displaying the electronic map and the object identity photographed by the virtual camera through the navigation interface.

During a normal traveling process, when the traveling state does not need to be changed, in order that the user views the situation of a road ahead and the change situation of the navigation route, the terminal controls the virtual camera to photograph at a lower height and a smaller overhead angle (for example, 20°) so as to obtain the electronic map under a long-distance view. Thus, the user can view the electronic map and the navigation route at a longer distance through the navigation interface, and the user can master the approximate change situation of a longer navigation route.

An exemplary implementation of step 401 is similar to that of step 201, and is not described again in this embodiment of this disclosure.

In step 402, based on a change of a traveling state of a navigation object, an adjustment mode of the object identity is determined based on a change type of the traveling state.

The change type of the traveling state includes a traveling direction change (for example, turning, U-turning, entering a branch rod, and the like) and a traveling lane change (lane changing). The terminal adjusts the object identity in different modes under the two change types. For example, the adjustment mode of the object identity in the identity display region includes horizontal adjustment and vertical adjustment. Step 402 includes the following steps:

In an embodiment, the adjustment mode can be determined as a vertical adjustment based on the change type being a traveling direction change and a distance between the object identity and a direction change node being less than a first distance threshold. The direction change node is a node in the electronic map where a traveling direction changes.

In this embodiment of this disclosure, when the change type is the traveling direction change, the terminal does not adjust the display position of the object identity until an actual traveling direction of the navigation object starts to change, but executes the step of adjusting the display position of the object identity before the actual traveling direction starts to change. That is, the terminal determines whether the traveling direction of the navigation object is about to change based on the pre-generated navigation route and the current position of the navigation object, and it is determined whether the traveling direction is about to change by comparing whether the distance between the object identity and the node where the traveling direction changes is small. Correspondingly, the terminal has a first distance threshold. The distance between the object identity and the direction change node is obtained, and a relationship between the distance and the first distance threshold is determined by comparison. If the distance between the object identity and the direction change node is less than the first distance threshold, it is indicated that the traveling direction of the terminal is about to change, and the display position of the object identity starts to be adjusted vertically.

When the traveling direction of the navigation object is about to change, the terminal controls the object identity and the electronic map to move relatively, and the degree of change of the electronic map is weakened by controlling the small movement of the object identity in the identity display region, so as to avoid a stronger feeling of dizziness to the user due to a violent change of the electronic map when the object identity is fixed.

In a possible implementation, the terminal determines a geographical position of the navigation object in real time, and determines whether the navigation object needs to change the traveling direction based on the pre-determined navigation route. When it is determined that the navigation object needs to change the traveling direction after a preset distance, the display position of the object identity in the identity display region is adjusted vertically. The position adjustment of the object identity is completed before the navigation object starts to change the traveling direction. The moved electronic map and the object identity are displayed through the navigation interface. The user can more clearly observe the nearby navigation route and learn how to change the traveling direction, thereby reducing the degree of change of the electronic map as much as possible.

And when the distance between the object identity and the direction change node is less than the first distance threshold (namely, the distance between the navigation object and the position corresponding to the direction change node is less than an actual distance corresponding to the first distance threshold), the terminal vertically adjusts the display position of the object identity in the identity display region. The direction change node is a node where the traveling direction indicated by the navigation route in the map changes. For example, if the navigation route indicates that a left turn is applied at a next intersection in the map, the intersection is the direction change node.

Schematically, a developer determines, by testing, to control the relative movement between the map and the object identity at 50 m before changing the traveling direction, so that the relative movement can be ended at an appropriate timing, namely, can be completed before the navigation object arrives at the position corresponding to the direction change node. Thus, the terminal determines the first distance threshold based on 50 m and the current map scale. For example, the first distance threshold is 5 cm.

In an embodiment, the adjustment mode is determined as a horizontal adjustment based on a change of the traveling state of the navigation object and the change type being a traveling lane change.

When the traveling lane of the navigation object changes, unlike turning and U-turning, the traveling road and traveling direction of the vehicle are not changed, the lane where the vehicle is located changes, and the object identity needs to be horizontally moved. Correspondingly, in a possible implementation, when the change type of the traveling state is the traveling lane change, the terminal determines that the adjustment mode of the object identity is horizontal adjustment, such as rightward adjustment or leftward adjustment.

Unlike turning or U-turning, when the vehicle changes lanes, the road on which the vehicle travels and the traveling direction of the vehicle are not changed, but the lane on which the vehicle travels changes. In a possible implementation, the map in this embodiment of this disclosure is a three-dimensional map at a lane level. In response to the change in the traveling lane of the navigation object, the terminal controls the relative movement between the object identity and the map to reflect the lane changing process of the navigation object in real time.

In step 403, a display position of the object identity is adjusted in the identity display region according to the adjustment mode.

The change types of different traveling states correspond to different adjustment modes. For example, when the change type of the traveling state is the traveling lane change, the object identity needs to be adjusted horizontally, and when the change type of the traveling state is the traveling direction change, the object identity needs to be adjusted vertically. In a possible implementation, after the terminal determines the adjustment mode of the object identity based on the change type of the traveling state, the terminal adjusts the display position of the object identity in the identity display region according to the adjustment mode.

When the terminal determines the adjustment mode as vertical adjustment in a case that the change type of the traveling state is the traveling direction change, step 403 further includes the following steps:

In an embodiment, the navigation perspective is switched from the first perspective to a second perspective, where a field-of-view distance under the first perspective is greater than a field-of-view distance under the second perspective.

In a possible implementation, the navigation interface corresponds to at least two navigation perspectives, namely, includes at least a first perspective and a second perspective. The first perspective is a long-distance perspective, and the second perspective is a short-distance perspective. That is, a field-of-view distance under the first perspective is greater than a field-of-view distance under the second perspective (for example, an overhead angle and height of a virtual camera under the first perspective are less than an overhead angle and height of the virtual camera under the second perspective, and correspondingly, an electronic map and a navigation route are visible further under the first perspective than under the second perspective). The terminal displays the electronic map and the object identity under the first perspective by default. In a case that the distance between the object identity and the direction change node is less than the first distance threshold, the terminal switches the navigation perspective of the navigation interface from the first perspective to the second perspective. For example, the virtual camera is controlled to move upwards on a spherical surface centered on the object identity, and the orientation of the virtual camera is aligned with the object identity to shorten the field-of-view distance, so that the navigation interface displays closer electronic maps and navigation routes more.

When the navigation perspective is switched from the first perspective to the second perspective, the attention of a user may be transferred from the far navigation route to the near navigation route, so that the user can pay attention to how to change the traveling direction in front, and the user can also view the traveling route near the change of the traveling direction in more detail by paying more attention to the near navigation route after the perspective is switched.

In an example, during the perspective switching process, the terminal still updates displaying of the electronic map based on the traveling direction, traveling speed, and the like of the navigation object.

Figure 5:
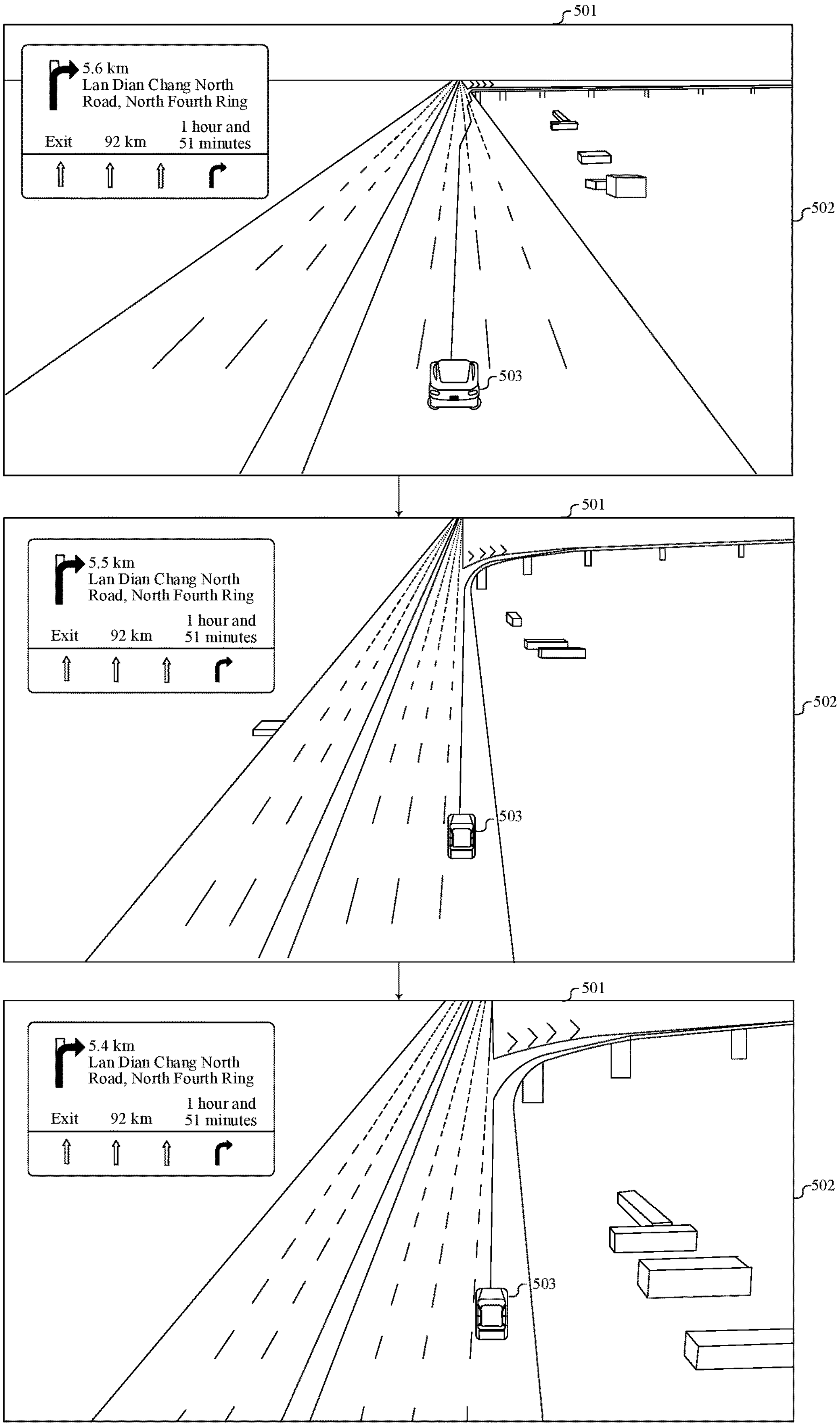
FIG. 5 is a schematic diagram of a navigation interface change process at a direction change node according to an exemplary embodiment of this disclosure.

Schematically, as shown in FIG. 5, the navigation interface 501 includes an electronic map 502 and an object identity 503. When it is determined that the distance between the object identity 503 and the direction change node is less than 5 cm, namely, the navigation object needs to travel to the right front after 50 m to enter a branch road, the terminal switches the navigation perspective from the first perspective (corresponding to the perspective of the first figure in FIG. 5) to the second perspective (corresponding to the perspective of the second figure in FIG. 5). During the perspective switching process, displaying of the electronic map 502 is still updated based on the traveling situation of the navigation object. That is, the electronic map 502 is moved downwards.

In an embodiment, the display position of the object identity is adjusted upwards (or to an upper edger) in the identity display region, and increase a map scale of the electronic map.

The display position of the direction change node in the navigation interface does not change during the map scale increasing process. When the navigation perspective is switched from the first perspective to the second perspective, the terminal controls the electronic map and the object identity to move relatively at the same time so as to reduce the degree of change of the map as much as possible. The adjustment range of the object identity is within the identity display region. If the object identity has been adjusted to the edge of the identity display region, the adjustment of the display position of the object identity is stopped.

If the traveling process of the navigation object is displayed simply by moving the electronic map and adjusting the object identity, the degree of change of the electronic map is still large. Therefore, the terminal increases the map scale of the electronic map, namely, continuously enlarges the map and keeps the display position of the direction change node unchanged, so as to achieve the display effect that the object identity continuously moves to the direction change node. In the meantime, the terminal adjusts the display position of the object identity upwards, thereby reducing the enlarging speed of the map scale. Thus, the user can clearly view the traveling direction change situation at the direction change node, and the degree of change of the electronic map and the feeling of dizziness can also be reduced. In the meantime, it can be ensured that the object identity moves in the fixed visual focus region, so that the user can quickly determine the position of the vehicle.

When the terminal determines the adjustment mode as horizontal adjustment in a case that the change type of the traveling state is the traveling lane change, correspondingly, step 403 further includes the following steps:

In an embodiment, a lane change direction indicated by the traveling lane change is determined.

The terminal determines the position change situation of the navigation object through real-time positioning, and determines the lane change direction of the navigation object when it is determined that the lane where the navigation object is located is changed.

In an embodiment, the display position of the object identity is adjusted in a horizontal direction in the identity display region based on the lane change direction.

The terminal correspondingly controls the relative movement between the object identity and the map based on the lane change direction of the navigation object, namely, controls the object identity to move in the navigation interface according to the lane change direction of the navigation object, and controls the electronic map to move in the reverse direction based on the display position of the object identity, so as to achieve the display effect that the object identity changes lanes in the map. Since the display position of the object identity is adjusted, the degree of change of the electronic map can be reduced in a case of ensuring that the object identity is in the identity display range.

In a possible implementation, step 403*d* further includes the following steps.

In an example, to determine the horizontal adjustment mode of the object identity in the identity display region, it may be required to ensure that the horizontal adjustment mode is consistent with the lane change direction. Correspondingly, in a possible implementation, when the lane change direction is rightward lane change, the display position of the object identity in the identity display region needs to be adjusted rightwards correspondingly. When the lane change direction is leftward lane change, the display position of the object identity in the identity display region needs to be adjusted leftwards correspondingly.

In an example, the terminal first adjusts the display position of the object identity in the identity display region based on the lane change direction, and then horizontally adjusts the electronic map after the display position of the object identity cannot be further adjusted. Or, the terminal simultaneously adjusts the display position of the object identity in the identity display region and the electronic map. Thus, in a case that the lane change direction is rightward lane change, the object identity is controlled to move rightwards in the identity display region, and the electronic map is controlled to move leftwards. In a case that the lane change direction is leftward lane change, the object identity is controlled to move leftwards in the identity display region, and the electronic map is controlled to move rightwards.

Figure 7:
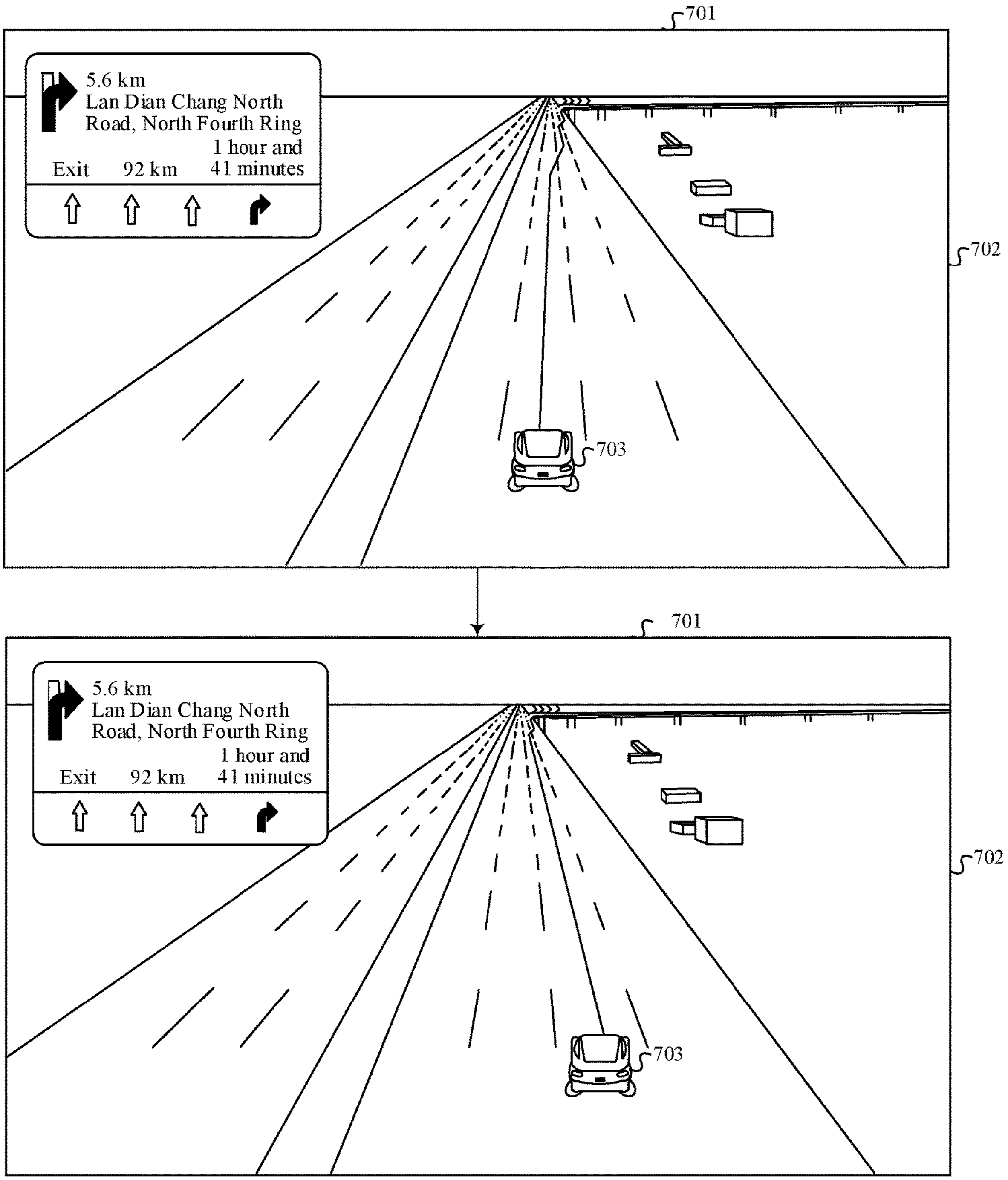
FIG. 7 is a schematic diagram of a navigation interface change process during lane change according to an exemplary embodiment of this disclosure.

FIG. 7 schematically shows a change situation of a navigation interface display content when a navigation object changes lanes. The terminal determines, based on navigation information, that the navigation object moves to the nearest lane rightwards. That is, the lane change direction is rightward. Then, an object identity 703 in a navigation interface 701 is controlled to move rightwards in an identity display region, while an electronic map 702 is controlled to move leftwards.

In step 404, the display of the electronic map is updated based on the display position of the object identity in the identity display region being adjusted to an edge of the identity display region.

In an example, this embodiment describes an example in which the object identity is updated first and then the electronic map is updated. By updating the object identity first, the object identity is adjusted to the edge of the identity display region. By maximizing the position adjustment of the object identity, the amplitude of the subsequent adjustment of the electronic map can be reduced. In a possible implementation, displaying of the electronic map may be updated based on the display position of the object identity in the identity display region in a case that the object identity is adjusted to the edge of the identity display region.

In an example, the terminal synchronously updates displaying of the electronic map in the process of adjusting the display position of the object identity. In an example, the terminal fixedly displays the electronic map when adjusting the display position of the object identity, and updates the electronic map after adjusting the object identity to the edge of the identity display region.

In an example, the electronic map may not need to be updated if the display position of the object identity coincides with the change in the traveling state by updating the display position of the object identity.

When the adjustment mode of the object identity is vertical adjustment in a case that the change type of the traveling state is the traveling direction change, step 404 includes the following steps:

In an embodiment, the object identity is adjusted to an upper edge of the identity display region, and rotate the electronic map based on the display position of the object identity in the identity display region in a case that the map scale reaches a first scale.

The first scale is an enlarged maximum scale of the electronic map. That is, when the electronic map is enlarged to the first scale, the electronic map cannot be enlarged continuously.

When the map scale is enlarged to the first scale, the enlargement cannot be continued. At this moment, the terminal continues to move the electronic map even if the direction change node moves downwards, so as to achieve the display effect that the object identity continuously approaches the direction change node. In this process, if the object identity has moved to an upper edge of the identity display region before the map scale is enlarged to the first scale, the terminal controls the object identity to be stationary and moves the map downwards until, and moves the map when the object identity moves to the upper edge. If the object identity does not move to the upper edge, the terminal controls the object identity to move upwards while controlling the map to move downwards.

Schematically, as shown in FIG. 5, after switching the navigation perspective to the second perspective, the terminal controls the object identity 503 to move upwards in the identity display region, and increases the map scale. It can be seen from the comparison of a second image to a third image in FIG. 5 that the terminal controls the display position of the direction change node (namely, a road junction in right front) in the navigation interface 501 to be unchanged, and the display effect that the object identity 503 moves to the direction change node is achieved by moving the object identity 503 and increasing the map scale. The user can view the enlarged electronic map through the navigation interface at this moment, and can quickly determine the change situation of the traveling direction in the navigation route.

Figure 6:
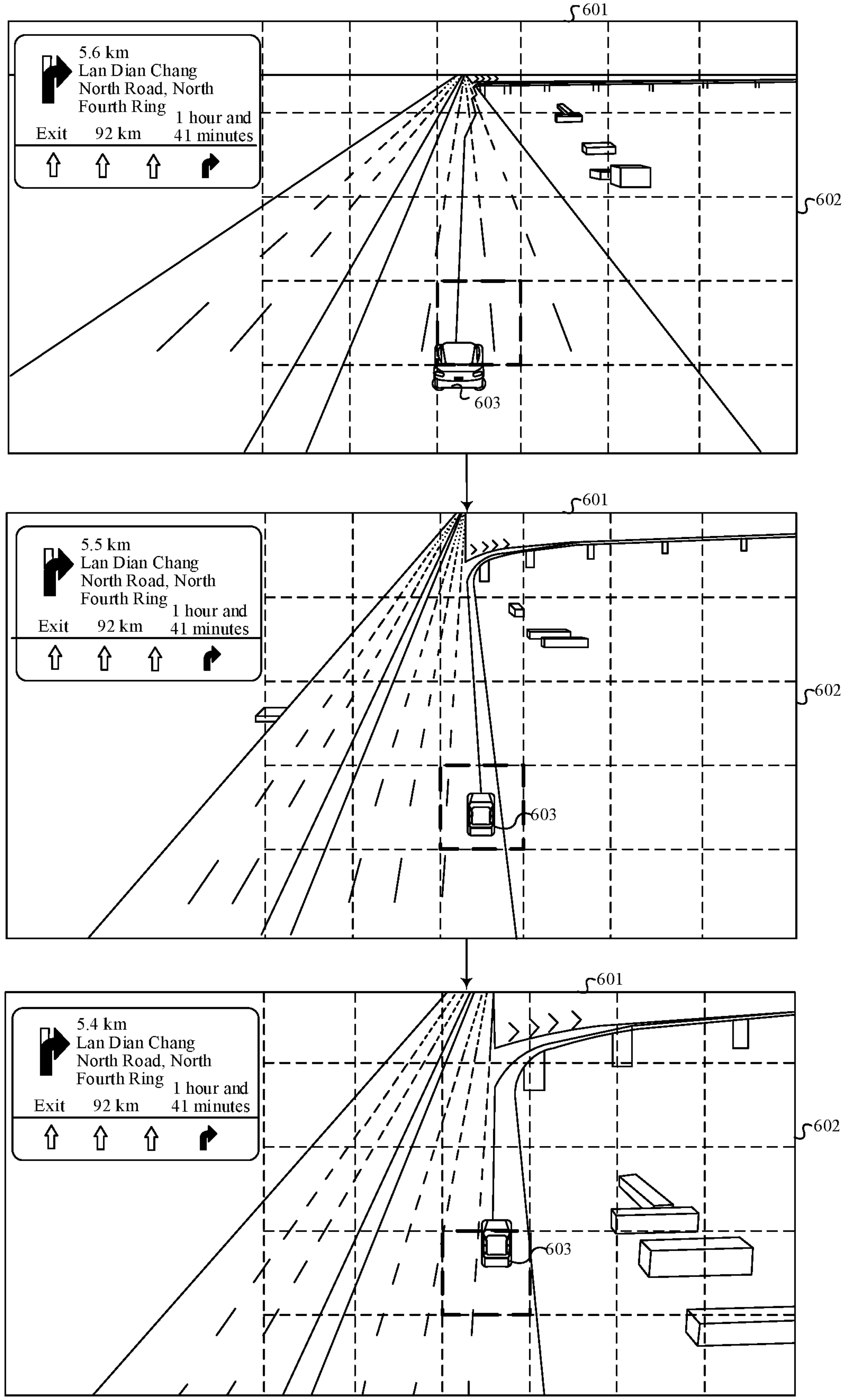
FIG. 6 is a schematic diagram of a navigation interface change process at a direction change node according to another exemplary embodiment of this disclosure.

In order to facilitate demonstrating the change process of the electronic map and the object identity, as shown in FIG. 6, a navigation interface 601 is gridded (the dotted line corresponding to the grid is not visible in an actual navigation interface), and an object identity 603 is located in one of the fixed visual focus regions (namely, in the grid corresponding to column 3 in the horizontal direction and row 4 in the vertical direction). Initially, the object identity 603 is located at the lower edge of the identity display region. The terminal moves an electronic map 602. Then the navigation perspective is switched to the second perspective. The terminal controls the object identity 603 to move upwards in the identity display region, and increases the map scale.

The object identity starts to change the traveling direction after arriving at the direction change node. At this moment, the terminal has completed the method for adjusting the object identity and scaling, so as to control the electronic map to move and rotate relative to the object identity based on the change situation of the traveling direction of the navigation object, thereby achieving the display effect that the object identity changes the traveling direction at the direction change node.

Accordingly, after the navigation object moves away from the direction change node, the terminal also needs to restore the navigation perspective and the display position of the object identity, so as to continue to observe the distant navigation route through the long-distance perspective and prepare for arriving at a next node. Therefore, after step 404, the navigation interface display method according to this embodiment of this disclosure further includes the following steps:

In a first step, the display position of the object identity is adjusted in the identity display region based on the distance between the object identity and the direction change node being greater than a second distance threshold.

In an example, after the navigation object moves away from the direction change node, in order to restore the navigation perspective and the display position of the object identity, the display position of the object identity may be adjusted in the opposite way to the previous adjustment when approaching the direction change node.

The relative movement between the electronic map and the object identity is controlled when the distance between the object identity and the direction change node is greater than the second distance threshold. In a possible implementation, step 1 further includes a step as follows:

The display position of the object identity is adjusted downwards (or is adjusted toward a lower side) in the identity display region and the map scale is reduced in a case that the distance between the object identity and the direction change node is greater than the second distance threshold.

As opposed to the adjusted display position of the object identity previously approaching the direction change node, in a possible implementation, when the terminal determines that the distance between the object identity and the direction change node is greater than the second distance threshold, it is indicated that the navigation object has completed the traveling direction change, and moves away from the direction change node. The display position of the object identity needs to be adjusted in the opposite direction. However, the object identity is adjusted upwards when previously approaching the direction change node, and the map scale is increased. The opposite operation is as follows. The terminal adjusts the display position of the object identity downwards in the identity display region and reduces the map scale, so as to embody the dynamic process of the navigation object moving away from the direction change node.

In an example, in a case that the distance between the object identity and the direction change node is greater than the second distance threshold and the distance between the object identity and a next direction change node is greater than the first distance threshold, the terminal controls the relative movement between the electronic map and the object identity. In a case that the distance between the object identity and the direction change node is greater than the second distance threshold and the distance between the object identity and the next direction change node is less than the first distance threshold, the terminal controls the object identity to be stationary at the current display position, and updates displaying of the electronic map based on the traveling direction.

In a second step, the display of the electronic map is updated based on the display position of the object identity in the identity display region and a traveling direction of the navigation object in a case that the object identity is adjusted to an edge of the identity display region.

Similar to the process of updating the object identity and the electronic map when the object identity approaches the direction change node, it is also possible to continue to update displaying of the electronic map after adjusting the display position of the object identity in the identity display region when the object identity moves away from the direction change node. Correspondingly, in a possible implementation, displaying of the electronic map may be updated based on the display position of the object identity in the identity display region and a current traveling direction of the navigation object in a case that the object identity is adjusted to the edge of the identity display region.

In a possible implementation, step 2 further includes the steps as follows:

For example, a display of the electronic map is updated based on the display position of the object identity in the identity display region and the traveling direction of the navigation object in a case that the object identity is adjusted to a lower edge of the identity display region and the map scale reaches a second scale.

The second scale is a minimum scaling multiple of the electronic map reduced by the terminal. Thus, after the electronic map is reduced to the second scale, the electronic map can no longer be reduced.

When the distance between the object identity and the direction change node is greater than the second distance threshold, the terminal first controls the object identity to move downwards in the identity display region, and also reduces the map scale so as to achieve the display effect that the object identity moves away from the direction change node. When the map scale is reduced to the second scale, the terminal controls the electronic map to move downwards. If the object identity has been adjusted to the lower edge of the identity display region at this moment, the electronic map is moved. If the object identity does not arrive at the lower edge of the identity display region, the object identity and the electronic map are controlled to move downwards simultaneously. However, the speed of relative movement therebetween is consistent with the speed of relative movement between the navigation object and an actual road (that is, the movement speed of the map is greater than the movement speed of the object identity).

In another possible implementation, when the distance between the object identity and the direction change node is greater than the second distance threshold, the terminal controls the electronic map and the object identity to move downwards. When the object identity moves to the lower edge of the identity display region, the terminal controls the object identity and the electronic map to be stationary, and gradually reduces the electronic map scale. When the map scale is reduced to the second scale, the terminal continues to move the electronic map.

In an example, in other possible implementations, the terminal may first reduce the map scale of the electronic map to the second scale, and then move the object identity downwards. When the object identity moves to the lower edge of the identity display region, the terminal continues to move the electronic map.

When the adjustment mode of the object identity is horizontal adjustment in a case that the change type of the traveling state is the traveling lane change, step 404 includes the steps as follows:

In an embodiment, the electronic map is adjusted leftwards (or to a left edge) of the navigation interface based on the display position of the object identity in a case that the lane change direction is rightward lane change and the object identity is adjusted to a right edge of the identity display region.

In a possible implementation, when the terminal determines that the lane change direction is rightward lane change, the object identity needs to move rightwards. When the object identity cannot move rightwards and the electronic map needs to be adjusted to make the object identity move rightwards, correspondingly, the electronic map needs to be adjusted reversely. That is to say, the electronic map needs to be adjusted leftwards, thereby achieving the rightward movement effect of the object identity.

In an embodiment, the electronic map is adjusted rightwards (or to an upper edge) of the navigation interface based on the display position of the object identity in a case that the lane change direction is leftward lane change and the object identity is adjusted to a left edge of the identity display region.

When the terminal determines the lane change mode of the navigation object and correspondingly adjusts the display position of the object identity, the electronic map is adjusted reversely. Compared with a position adjustment of the map or the object identity, the simultaneous reverse movement of the electronic map and the object identity can reduce the degree of change of the map and the object identity with respect to the navigation interface. When the object identity moves to the edge of the identity display region and the navigation object still continues to change lanes at this moment, the terminal stops adjusting the display position of the object identity, fixedly displays the object identity, and continues to adjust the electronic map, so that the display position of the object identity changes largely, and the user cannot quickly determine the position of the vehicle.

In an example, when the lane change direction is leftward lane change, the object identity needs to move leftwards. When the object identity has moved to the left edge, it is indicated that the object identity cannot continue to move leftwards, the electronic map needs to be adjusted to achieve the leftward movement effect of the object identity, and correspondingly, the electronic map needs to be adjusted reversely. That is to say, the electronic map needs to be adjusted rightwards, thereby achieving the leftward movement effect of the object identity.

In another possible implementation, the navigation object may have stopped lane changing when the object identity has not moved to the edge of the identity display region. Then the terminal stops adjusting the display position of the object identity and continues to update displaying of the electronic map. After step 403, the navigation interface display method according to this embodiment of this disclosure further includes the steps as follows:

For example, the object identity is displayed in a fixed position in the identity display region in a case that the object identity does not move to the edge of the identity display region and the navigation object stops lane change. A display of the electronic map is updated based on the display position of the object identity and the traveling direction of the navigation object.

The terminal adjusts the display position of the object identity based on the position change situation of the navigation object in real time. When the navigation object stops lane changing, if the object identity does not move to the edge of the identity display region, the object identity is fixedly displayed in the identity display region, and displaying of the electronic map continues to be updated based on the traveling direction of the navigation object.

In this embodiment of this disclosure, when it is determined that a navigation object is about to arrive at a direction change node, a navigation perspective is first switched from a first perspective of a long-distance view to a second perspective of a short-distance view. Then, by changing a map scale, adjusting a display position of an object identity in an identity display region and moving an electronic map, in a case of ensuring that the object identity is displayed in a fixed grid region, the degree of change of the electronic map and the feeling of dizziness of a user can be reduced, and the user can easily view the route change situation at the direction change node clearly and can change a traveling direction quickly according to a navigation route, thereby improving the driving efficiency and ensuring the safety of driving.

In a possible implementation, the terminal determines in real time, according to the geographical position of the navigation object and the navigation route, whether the traveling direction of the navigation object changes, namely, whether to control the object identity and the map to move relatively. Step 203 further includes the following sub-steps:

For example, a navigation instruction is generated based on the change situation of the traveling road in the navigation route when the traveling road in the navigation route changes. The display position of the object identity is adjusted in the identity display region and a display of the electronic map is updated in a case that the navigation object travels according to the navigation instruction and the traveling state changes.

Figure 8:
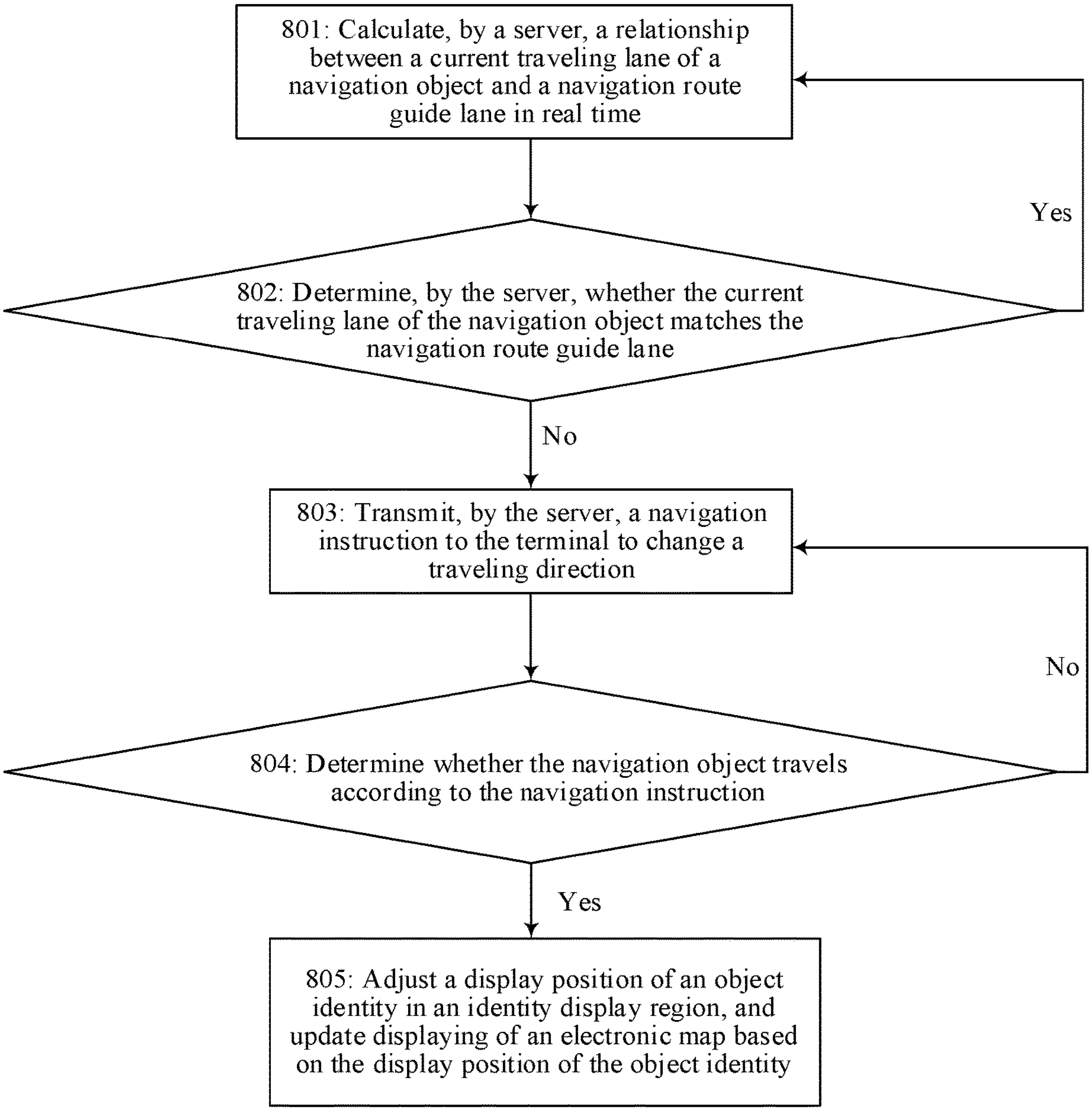
FIG. 8 is a flowchart of a navigation interface display method according to another exemplary embodiment of this disclosure.
Figure 9:
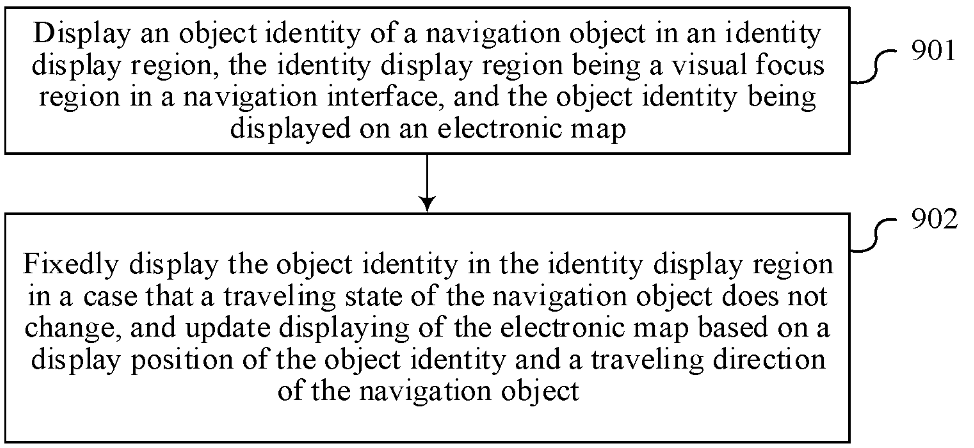
FIG. 9 is a flowchart of a navigation interface display method according to another exemplary embodiment of this disclosure.

In another possible implementation, the navigation instruction is generated by a server and transmitted to the terminal. The terminal transmits position information of the navigation object to the server in real time. The server determines, based on the position information of the navigation object and a pre-generated navigation route, whether the traveling road of the navigation object needs to be changed (namely, whether the navigation object is about to arrive at the direction change node). If yes, a navigation instruction is generated, and the navigation instruction is transmitted to the terminal. After receiving the navigation instruction, the terminal prompts the user by means of an interface or voice to change the traveling direction according to the navigation instruction. If it is detected that the navigation object travels according to the navigation instruction, the display position of the object identity is adjusted and the electronic map is updated. The interaction process between the terminal and the server is as shown in FIG. 8. As shown in FIG. 9, in step 801, the server calculates a relationship between a current traveling lane of a navigation object and a navigation route guide lane in real time. In step 802, the server determines whether the current traveling lane of the navigation object matches the navigation route guide lane. If yes, step 801 is performed again. If no, step 803 is performed next. In step 803, the server transmits a navigation instruction to the terminal to change a traveling direction. In step 804, it is determined whether the navigation object travels according to the navigation instruction. If yes (e.g., the navigation object travels according to the navigate instruction), step 805 is performed next. If no (e.g., the navigation object does not travel according to the navigation instruction), step 803 is performed again. In step 805, a display position of an object identity in an identity display region is adjusted, and a display of an electronic map is updated based on the display position of the object identity.

In a possible implementation, when the traveling state of the navigation object does not change (traveling straight in a certain direction), since the relative position between the object identity and the electronic map also changes according to the fixed traveling direction, the terminal displays the traveling process of the object identity and the surrounding environment by fixing the object identity and updating the electronic map. FIG. 9 shows a flowchart of a navigation interface display method according to another exemplary embodiment of this disclosure. This embodiment describes an example in which the method is applied to a terminal having a navigation function. The method includes the steps as follows:

In step 901, an object identity of a navigation object is displayed in an identity display region, where the identity display region is a visual focus region in a navigation interface, and the object identity is displayed on an electronic map.

An exemplary implementation of step 901 is similar to that of step 201, and is not described again in this embodiment of this disclosure.

In step 902, the object identity is displayed in a fixed position in the identity display region in a case that a traveling state of the navigation object does not change, and update displaying of the electronic map based on a display position of the object identity and a traveling direction of the navigation object.

In a possible implementation, when the navigation object travels straight in a current road and the traveling state does not change, the terminal displays a traveling process of the navigation object by fixedly displaying the object identity and adjusting the electronic map. For example, when the navigation object travels in the north direction in the current lane, the terminal fixes the object identity and moves the electronic map downwards in the navigation interface.

In an example, the terminal determines a moving speed of the electronic map based on a traveling speed of the navigation object and a map scale corresponding to the map. Or, the terminal determines position information of the navigation object once every preset duration, and moves the electronic map based on the position information.

In this embodiment of this disclosure, when the traveling state of the navigation object does not change, the terminal fixedly displays the object identity. By adjusting the electronic map to achieve the display effect that the object identity moves in the electronic map, the user may determine that the object identity is displayed at the same position, so that the current position of the navigation object can be obtained from the navigation interface through a quick glance, thereby improving the efficiency of the user in determining the position and viewing the navigation route, and ensuring the safety of driving.

The various embodiments show the process in which the terminal performs the navigation interface display method in the three-dimensional map and the three-dimensional model scenario. The navigation interface display method according to this embodiment of this disclosure may also be applied to displaying a navigation interface corresponding to a two-dimensional map and a two-dimensional identity (or two-dimensional model).

Figure 10:
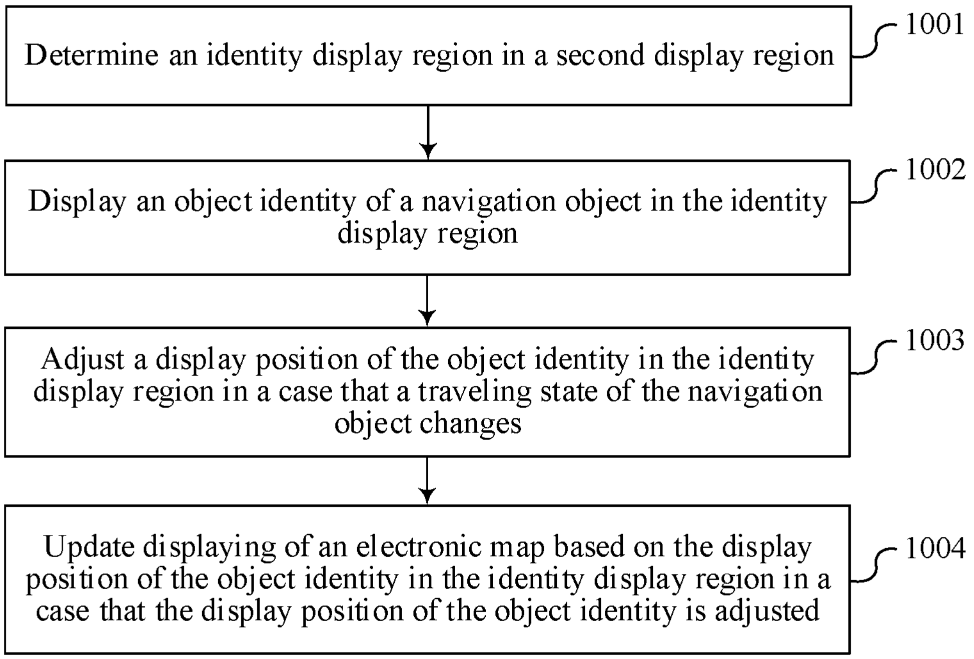
FIG. 10 is a flowchart of a navigation interface display method according to another exemplary embodiment of this disclosure.

The various embodiments show the process in which the terminal displays the object identity based on the identity display region and relatively moves the map and the object identity under various traveling situations of the navigation object. Since the size of the navigation interface is large and the size of the object identity is small, it is necessary to determine an appropriate identity display region so as to facilitate a user to view. FIG. 10 shows a flowchart of a navigation interface display method according to another exemplary embodiment of this disclosure. This embodiment describes an example in which the method is applied to a terminal having a navigation function. The method includes the following steps:

In step 1001, an identity display region is determined in a second display region.

In a possible implementation, a navigation interface includes a first display region and a second display region, the first display region and the second display region jointly display a map, a guide panel is superimposed and displayed above the map in the first display region, and the guide panel includes navigation guide information. Furthermore, basic functional controls such as a voice control and a navigation disable control are displayed in the guide panel.

The terminal determines the identity display region based on the second display region, and step 1001 further includes the following steps:

In an embodiment, the second display region can be partitioned into a plurality of grid regions.

In a possible implementation, the terminal grids the second display region or the complete navigation interface. For example, the terminal divides the second display region horizontally into m columns and vertically into n rows, generates n*m fixed grid regions, and determines one fixed grid region from the obtained n*m grid regions as the identity display region. In an illustrative example, the grid region in row 3 and column 3 may be determined as the identity display region.

In an example, the number of horizontally divided columns and the number of vertically divided rows may be dynamically changed based on the size of the second display region or the size of the complete navigation interface. If the second display region occupies the entire terminal screen, the division may be further performed according to the size of the terminal screen. If the second display region is larger, the number of columns and rows correspondingly divided is larger. If the second display region is smaller, the number of columns and rows correspondingly divided is smaller.

In an example, some users may expect a larger identity display region in order to make the size of the identity display region more consistent with user needs, for example. The terminal may determine the user needs based on a display size of a terminal font. For example, the terminal font displayed is smaller, it is indicated that the user has a better vision, and a relatively small identity display region may be set. If the terminal font displayed is larger, a relatively large identity display region may be set, so that the user can find an object representation more easily.

In an embodiment, a fixed grid region is determined in the second display region as the identity display region, where a midpoint of the fixed grid region is a golden section point of the second display region.

In a possible implementation, in order to improve the convenience of viewing the navigation interface for the user to quickly determine the position of the vehicle, the terminal determines the identity display region based on the golden section point of the second display region. For example, the terminal determines a golden section line of the second display region in the horizontal direction and a golden section line of the second display region in the vertical direction, and determines a grid region containing an intersection point of the two golden section lines as a fixed grid region. A display region corresponding to the fixed grid region is the identity display region.

Figure 11:
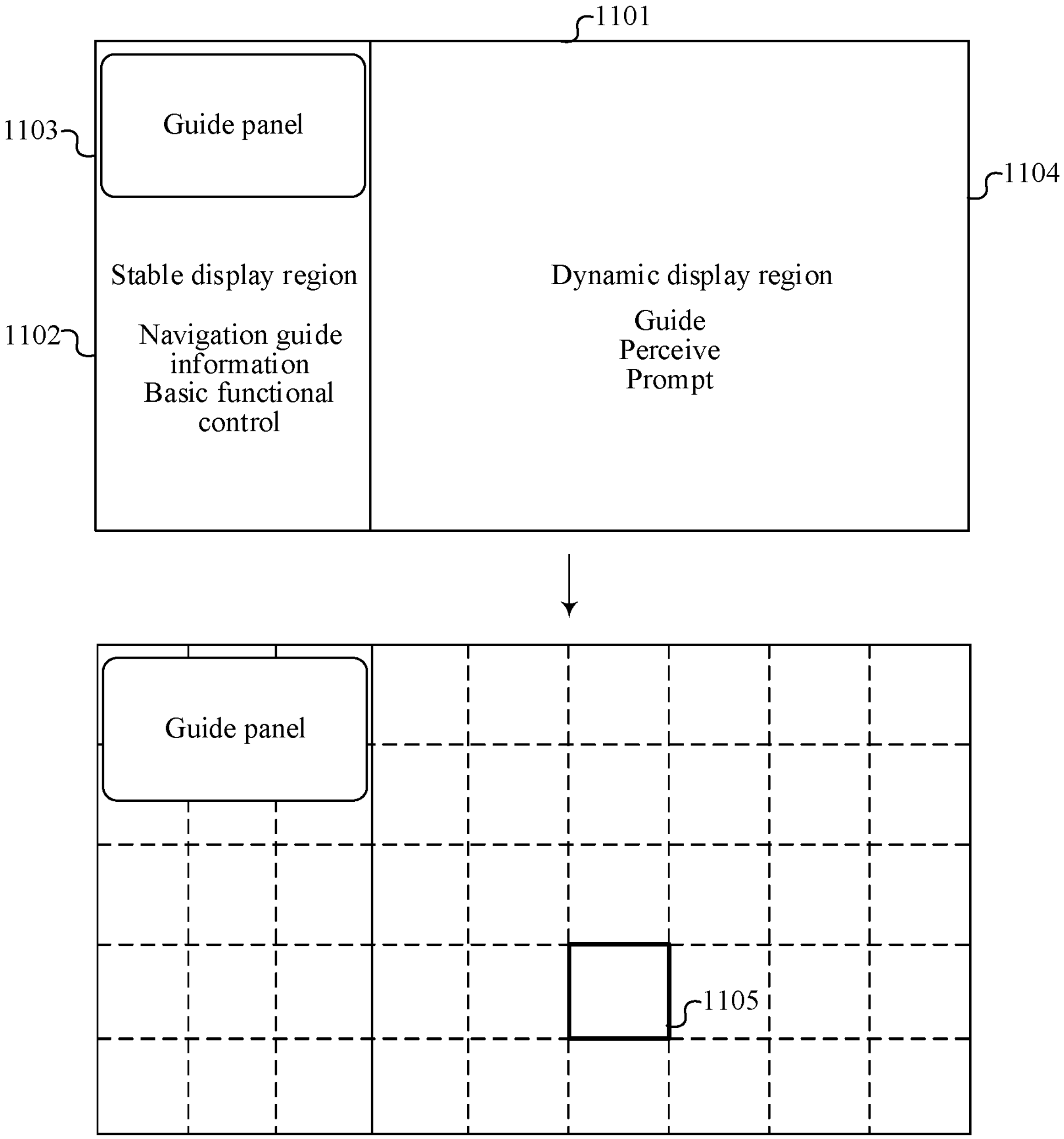
FIG. 11 is a schematic diagram of an identity display region determining process according to an exemplary embodiment of this disclosure.

Schematically, as shown in FIG. 11, a navigation interface 1101 includes a stable display region (first display region) 1102 on the left side and a dynamic display region (second display region) 1104 on the right side. A guide panel 1103 is superimposed and displayed above a map in the stable display region 1102. The terminal grids the dynamic display region 1104, and determines a fixed grid region 1105 as the identity display region based on the golden section point.

In step 1002, an object identity of a navigation object is displayed in the identity display region.

In step 1003, a display position of the object identity is adjusted in the identity display region in a case that a traveling state of the navigation object changes.

In step 1004, a display of an electronic map is updated based on the display position of the object identity in the identity display region in a case that the display position of the object identity is adjusted.

Exemplary implementations of steps 1002 to 1004 are similar to those of the foregoing steps 201 to 203, and will not be described in detail in this embodiment of this disclosure.

In this embodiment of this disclosure, the terminal first grids the second display region of the navigation interface, determines the identity display region from each generated grid region based on the golden section, and controls the object identity to be displayed in the identity display region, thereby improving the readability of the navigation interface and the convenience of the user for viewing the position of the vehicle.

Figure 12:
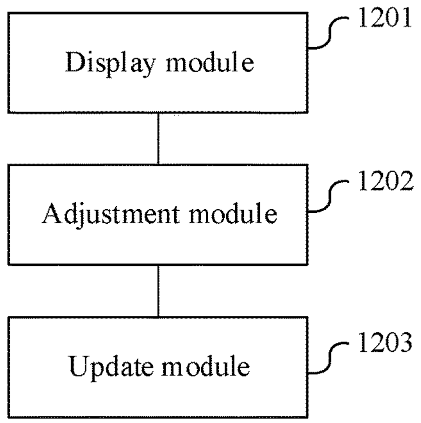
FIG. 12 is a structural block diagram of a navigation interface display apparatus according to an exemplary embodiment of this disclosure.

FIG. 12 is a structural block diagram of a navigation interface display apparatus according to an exemplary embodiment of this disclosure. The apparatus includes a display module 1201, an adjustment module 1202, and an update module 1203. One or more modules, submodules, and/or units of the apparatus can be implemented by processing circuitry, software, or a combination thereof, for example.

The display module 1201 is configured to display an object identity of a navigation object in an identity display region, the identity display region being a visual focus region in a navigation interface, and the object identity being displayed on an electronic map;

The adjustment module 1202 is configured to adjust a display position of the object identity in the identity display region in a case that a traveling state of the navigation object changes; and The update module 1203 is configured to update displaying of the electronic map based on the display position of the object identity in the identity display region in a case that the display position of the object identity is adjusted.

In an example, the adjustment module 1202 is further configured to determine an adjustment mode of the object identity based on a change type of the traveling state in a case that the traveling state of the navigation object changes, where the change type includes a traveling direction change or a traveling lane change.

The adjustment module 1202 is further configured to adjust the display position of the object identity in the identity display region according to the adjustment mode.

The update module 1203 is further configured to update displaying of the electronic map based on the display position of the object identity in the identity display region in a case that the object identity is adjusted to an edge of the identity display region.

In an example, the adjustment module 1202 is further configured to determine that the adjustment mode is vertical adjustment in a case that the change type is the traveling direction change and a distance between the object identity and a direction change node is less than a first distance threshold, where the direction change node is a node in the electronic map where the traveling direction changes.

In an example, the adjustment module 1202 is further configured to adjust the display position of the object identity upwards in the identity display region, and increase a map scale of the electronic map.

In an example, the update module 1203 is further configured to adjust the object identity to an upper edge of the identity display region, and rotate the electronic map based on the display position of the object identity in the identity display region in a case that the map scale reaches a first scale.

In an example, the display module 1201 is further configured to display the object identity in the identity display region with a first perspective as a navigation perspective, the object identity being displayed on the electronic map under the first perspective.

The apparatus further includes a perspective switching module. The perspective switching module is configured to switch the navigation perspective from the first perspective to a second perspective, where a field-of-view distance under the first perspective is greater than a field-of-view distance under the second perspective.

In an example, the adjustment module 1202 is further configured to adjust the display position of the object identity in the identity display region in a case that the distance between the object identity and the direction change node is greater than a second distance threshold.

The update module 1203 is further configured to update displaying of the electronic map based on the display position of the object identity in the identity display region and a traveling direction of the navigation object in a case that the object identity is adjusted to an edge of the identity display region.

In an example, the adjustment module 1202 is further configured to adjust the display position of the object identity downwards in the identity display region and reduce the map scale in a case that the distance between the object identity and the direction change node is greater than the second distance threshold.

In an example, the update module 1203 is further configured to update displaying of the electronic map based on the display position of the object identity in the identity display region and the traveling direction of the navigation object in a case that the object identity is adjusted to a lower edge of the identity display region and the map scale reaches a second scale.

In an example, the adjustment module 1202 is further configured to determine the adjustment mode as horizontal adjustment in a case that the traveling state of the navigation object changes and the change type is the traveling lane change.

The adjustment module 1202 is further configured to determine a lane change direction indicated by the traveling lane change and horizontally adjust the display position of the object identity in the identity display region based on the lane change direction.

In an example, the adjustment module 1202 is further configured to adjust the display position of the object identity in the identity display region rightwards in a case that the lane change direction is rightward lane change and adjust the display position of the object identity in the identity display region leftwards in a case that the lane change direction is leftward lane change.

In an example, the update module 1203 is further configured to adjust the electronic map leftwards based on the display position of the object identity in a case that the lane change direction is rightward lane change and the object identity is adjusted to a right edge of the identity display region and adjust the electronic map rightwards based on the display position of the object identity in a case that the lane change direction is leftward lane change and the object identity is adjusted to a left edge of the identity display region.

In an example, the update module 1203 is further configured to fixedly display the object identity in the identity display region in a case that the object identity does not move to the edge of the identity display region and the navigation object stops lane change, and update displaying of the electronic map based on the display position of the object identity and the traveling direction of the navigation object.

In an example, the display module 1201 is further configured to fixedly display the object identity in the identity display region in a case that the traveling state of the navigation object does not change, and update displaying of the electronic map based on the display position of the object identity and the traveling direction of the navigation object.

In an example, the navigation interface (e.g., 1101) includes a first display region and a second display region. The first display region and the second display region jointly display the electronic map. A guide panel is superimposed and displayed above the electronic map in the first display region. The guide panel includes navigation guide information.

The apparatus further includes a determining module. The determining module is configured to determine the identity display region in the second display region.

In an example, the determining module is further configured to grid the second display region and determine a fixed grid region in the second display region as the identity display region, a midpoint of the fixed grid region being a golden section point of the second display region.

In an example, the electronic map is a three-dimensional map and the object identity is a three-dimensional model of the navigation object. In an example the electronic map is a two-dimensional map and the object identity is a two-dimensional identity of the navigation object.

In summary, in this embodiment of this disclosure, by adjusting a display position of an object identity and updating an electronic map, a change situation of a traveling state is shown, and before and after the object identity is adjusted, the object identity is located in an identity display region, so that the object identity is displayed in the identity display region regardless of the traveling state, thereby limiting a display region of the object identity. While showing the change situation of the traveling state, it can be ensured that a user determines the current position and a subsequent traveling route through a quick glance during the driving process, thereby improving the efficiency of the user in determining the position and viewing a navigation route, and ensuring the safety of driving.

Figure 13:
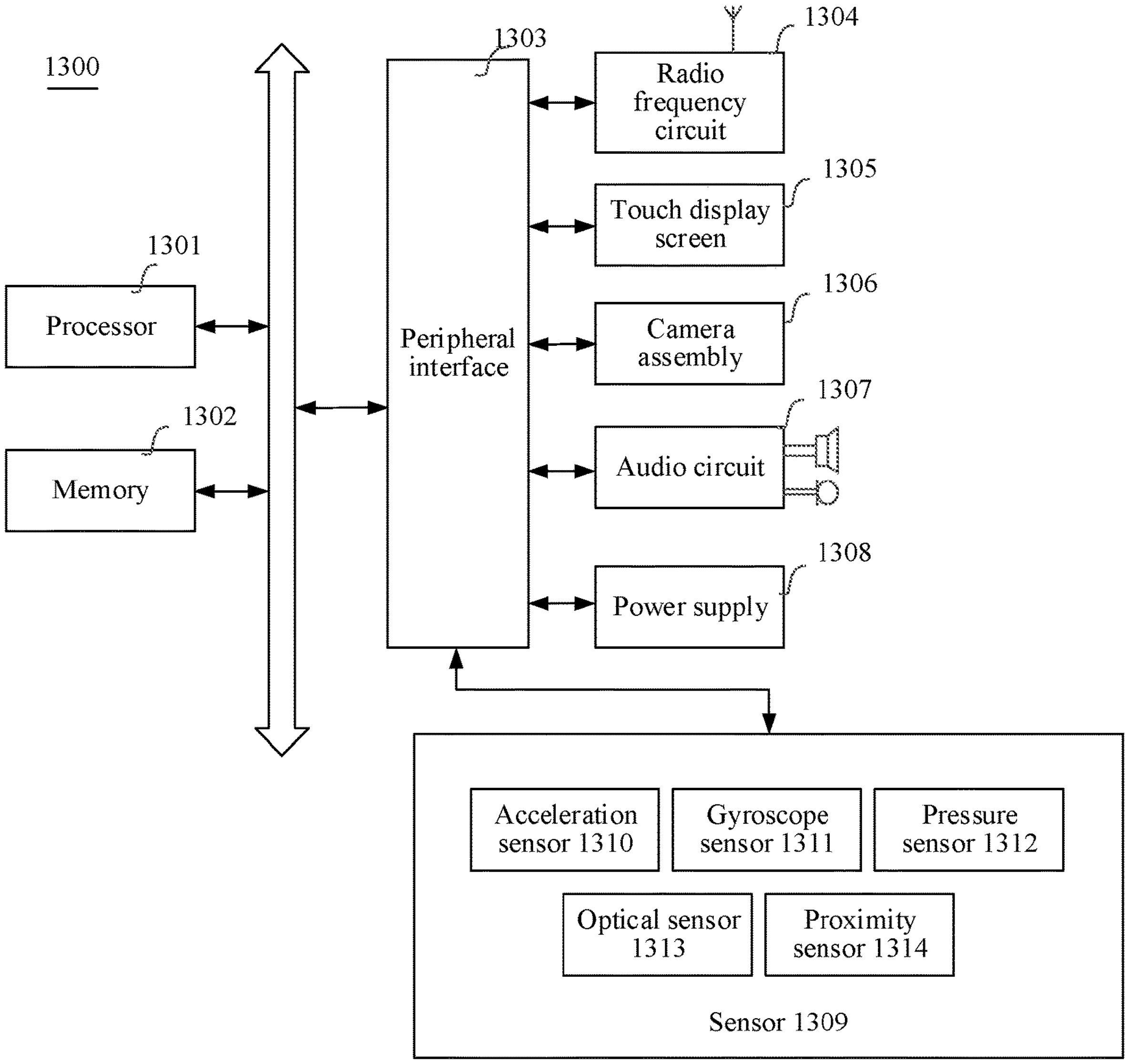
FIG. 13 is a structural block diagram of a terminal according to an exemplary embodiment of this disclosure.

FIG. 13 shows a structural block diagram of a terminal 1300 according to an exemplary embodiment of this disclosure. The terminal 1300 may be a portable mobile terminal, such as a smartphone, a tablet personal computer, a moving picture experts group audio layer III (MP3) player, or a moving picture experts group audio layer IV (MP4) player. The terminal 1300 may also be referred to as user equipment, a portable terminal, or another name.

Generally, the terminal 1300 includes processing circuitry, such as a processor 1301, and a memory 1302.

The processor 1301 may include one or more processing cores, such as a 4-core processor or an 8-core processor. The processor 1301 may be implemented in at least one hardware form of a digital signal processor (DSP), a field-programmable gate array (FPGA), and a programmable logic array (PLA). The processor 1301 may further include a main processor and a co-processor. The main processor is a processor for processing data in a wake-up state, and is also referred to as a central processing unit (CPU). The co-processor is a low-power processor for processing data in a standby state. In some embodiments, the processor 1301 may be integrated with a graphics processing unit (GPU). The GPU is responsible for rendering and drawing content to be displayed by a display screen. In some embodiments, the processor 1301 may further include an artificial intelligence (AI) processor. The AI processor is configured to process computing operations related to machine learning.

The memory 1302 may include one or more computer-readable storage media. The computer-readable storage media may be tangible and non-transitory. The memory 1302 may further include a high-speed random access memory and a nonvolatile memory, such as one or more disk storage devices or flash storage devices. In some embodiments, the non-transitory computer-readable storage medium in the memory 1302 is configured to store at least one instruction. The at least one instruction is used for execution by the processor 1301 to implement the method according to the foregoing embodiment of this disclosure.

In some embodiments, the terminal 1300 may further include a peripheral interface 1303 and at least one peripheral. For example, the peripheral includes at least one of a radio frequency circuit 1304, a touch display screen 1305, a camera 1306, an audio circuit 1307, and a power supply 1308.

In some embodiments, the terminal 1300 further includes one or more sensors 1309. The one or more sensors 1309 include, but are not limited to, an acceleration sensor 1310, a gyroscope sensor 1311, a pressure sensor 1312, an optical sensor 1313, and a proximity sensor 1314.

It is to be understood by a person skilled in the art that the structure shown in FIG. 13 is not limiting of the terminal 1300 and may include more or fewer assemblies than illustrated, or some assemblies may be combined, or different assembly arrangements may be employed.

An embodiment of this disclosure also provides a computer-readable storage medium, such as a non-transitory computer-readable storage medium. The computer-readable storage medium stores at least one instruction. The at least one instruction is loaded and executed by a processor to implement the navigation interface display method according to the foregoing embodiments.

According to an aspect of this disclosure, a computer program product or computer program is provided. The computer program product or computer program includes computer instructions. The computer instructions are stored in a computer-readable storage medium. A processor of a terminal reads the computer instructions from the computer-readable storage medium. The processor executes the computer instructions, so as to enable the terminal to perform the navigation interface display method according to the various optional implementations in the foregoing aspects.

A person skilled in the art can be aware that in the foregoing one or more examples, functions described in the embodiments of this disclosure may be implemented by hardware, software, firmware, or any combination thereof. When implemented by using software, the functions may be stored in the computer-readable medium or may be used as one or more instructions or code in the computer-readable medium for transmission. The computer-readable medium includes a computer storage medium and a communication medium. The communication medium includes any medium that enables a computer program to be transmitted from one place to another. The storage medium may be any available medium accessible to a general-purpose or dedicated computer.

The foregoing descriptions are merely optional embodiments of this disclosure, but are not intended to limit this disclosure. Any modification, equivalent replacement, or improvement made within the spirit and principle of this disclosure shall fall within the protection scope of this disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

What is claimed is:

1. A method of a display of a navigation interface, the method comprising:

displaying a representative model of a vehicle in an identity display region of the navigation interface, the identity display region being a view focus region of a user and arranged in a fixed region of the navigation interface of a terminal located inside the vehicle, a size of the fixed region in the navigation interface being a preset ratio of a size of the navigation interface, the fixed region being one of a plurality of grid regions in the navigation interface, and the representative model being displayed on an electronic map on the navigation interface;

adjusting, along a first direction and based on a change of a traveling state of the vehicle, a display position of the representative model in the identity display region such that at least a portion of the representative model is maintained in the fixed region of the navigation interface; and updating a display configuration of the electronic map in the navigation interface by shifting the electronic map in a second direction opposite to the first direction based on the display position of the representative model being adjusted to an edge of the identity display region.

2. The method according to claim 1, wherein:

the adjusting the display position of the representative model further comprises:

determining an adjustment mode of the representative model based on a change type of the traveling state of the vehicle, the change type including one of a traveling direction change or a traveling lane change, and adjusting the display position of the representative model in the identity display region according to the adjustment mode; and the updating the display configuration of the electronic map further comprises:

updating the display configuration of the electronic map based on the display position of the representative model being adjusted to the edge of the identity display region.

3. The method according to claim 2, wherein the determining the adjustment mode of the representative model further comprises:

determining that the adjustment mode is a vertical adjustment based on (i) the change type being the traveling direction change and (ii) a distance between the representative model and a direction change node being less than a first distance threshold, the direction change node indicating a position in the electronic map where a traveling direction of the representative model of the vehicle will be navigated to change.

4. The method according to claim 3, wherein the adjusting the display position of the representative model further comprises:

adjusting the display position of the representative model toward an upper edge of the identity display region; and increasing a map scale of the electronic map.

5. The method according to claim 4, wherein the updating the display configuration of the electronic map further comprises:

rotating the electronic map based on the display position of the representative model being adjusted to the upper edge of the identity display region and the map scale being increased to a first scale.

6. The method according to claim 4, wherein:

the displaying the representative model of the vehicle in the identity display region comprises:

displaying the representative model in the identity display region in a first navigation perspective; and the method further comprising:

switching the first navigation perspective to a second navigation perspective, a field-of-view distance under the first navigation perspective being greater than a field-of-view distance under the second navigation perspective.

7. The method according to claim 6, the method further comprising:

adjusting the display position of the representative model in the identity display region based on the distance between the representative model and the direction change node being greater than a second distance threshold; and based on the representative model being adjusted to the edge of the identity display region, updating the display configuration of the electronic map based on the display position of the representative model in the identity display region and the traveling direction of the vehicle.

8. The method according to claim 7, wherein the adjusting the display position of the representative model in the identity display region further comprises:

based on the distance between the representative model and the direction change node being greater than the second distance threshold, adjusting the display position of the representative model toward a lower edge of the identity display region; and reducing the map scale of the electronic map.

9. The method according to claim 8, wherein the updating the display configuration of the electronic map further comprises:

based on the representative model being adjusted to the lower edge of the identity display region and the map scale being reduced to a second scale, updating the display configuration of the electronic map by adjusting the electronic map toward an upper edge of the navigation interface.

10. The method according to claim 2, wherein:

the determining the adjustment mode of the representative model further comprises:

determining the adjustment mode as a horizontal adjustment based on the change of the traveling state of the vehicle and the change type of the traveling state being the traveling lane change; and the adjusting the display position of the representative model in the identity display region according to the adjustment mode further comprises:

determining a lane change direction indicated by the traveling lane change, and adjusting the display position of the representative model in a horizontal direction in the identity display region based on the lane change direction.

11. The method according to claim 10, wherein the adjusting the display position of the representative model in the horizontal direction further comprises:

adjusting the display position of the representative model toward a right edge of the identity display region based on the lane change direction being a right lane change; and adjusting the display position of the representative model toward a left edge of the identity display region based on the lane change direction being a left lane change.

12. The method according to claim 11, wherein the updating the display configuration of the electronic map further comprises:

adjusting the electronic map toward the left edge of the navigation interface based on the lane change direction being the right lane change and the representative model being adjusted toward the right edge of the identity display region; and adjusting the electronic map toward the right edge of the navigation interface based on the lane change direction being the left lane change and the representative model being adjusted toward the left edge of the identity display region.

13. The method according to claim 10, further comprising:

based on the representative model being not positioned at the edge of the identity display region and the vehicle not performing a lane change, displaying the representative model in a fixed position of the identity display region; and updating the display configuration of the electronic map by shifting the electronic map based on the display position of the representative model and a traveling direction of the vehicle.

14. The method according to claim 10, further comprising:

displaying the representative model in a fixed position of the identity display region based on the traveling state of the vehicle being not changed; and updating the display configuration of the electronic map by shifting the electronic map based on the display position of the representative model and a traveling direction of the vehicle.

15. The method according to claim 1, wherein:

the navigation interface includes a first display region and a second display region, the first display region and the second display region being configured to jointly display the electronic map, the first display region including a guide panel that is superimposed and displayed above the electronic map in the first display region, and configured to display navigation guide information; and the method further comprising:

determining the identity display region in the second display region.

16. The method according to claim 15, wherein the determining the identity display region in the second display region comprises:

partitioning the second display region into the plurality of grid regions; and determining a grid region of the plurality of grid regions in the second display region as the identity display region, a midpoint of the grid region being a golden section point of the second display region.

17. The method according to claim 1, wherein:

the electronic map includes one of a three-dimensional map and a two-dimensional map, and the representative model includes one of a three-dimensional model of the vehicle and a two-dimensional model of the vehicle.

18. An apparatus of a display of a navigation interface, the apparatus comprising:

processing circuitry configured to:

display a representative model of a vehicle in an identity display region of the navigation interface, the identity display region being a view focus region of a user and arranged in a fixed region of the navigation interface of a terminal located inside the vehicle, a size of the fixed region in the navigation interface being a preset ratio of a size of the navigation interface, the fixed region being one of a plurality of grid regions in the navigation interface, and the representative model being displayed on an electronic map on the navigation interface;

adjust, along a first direction and based on a change of a traveling state of the vehicle, a display position of the representative model in the identity display region such that at least a portion of the representative model is maintained in the fixed region of the navigation interface; and update a display configuration of the electronic map in the navigation interface by shifting the electronic map in a second direction opposite to the first direction based on the display position of the representative model being adjusted to an edge of the identity display region.

19. The apparatus according to claim 18, wherein the processing circuitry is configured to:

determine an adjustment model of the representative model based on a change type of the traveling state of the vehicle, the change type including one of a traveling direction change or a traveling lane change;

adjust the display position of the representative model in the identity display region according to the adjustment model; and update the display configuration of the electronic map based on the display position of the representative model being adjusted to the edge of the identity display region.

20. A non-transitory computer readable storage medium storing instructions which when executed by at least one processor cause the at least one processor to perform:

displaying a representative model of a vehicle in an identity display region of a navigation interface, the identity display region being a view focus region of a user and arranged in a fixed region of the navigation interface of a terminal located inside the vehicle, a size of the fixed region in the navigation interface being a preset ratio of a size of the navigation interface, the fixed region being one of a plurality of grid regions in the navigation interface, and the representative model being displayed on an electronic map on the navigation interface;

adjusting, along a first direction and based on a change of a traveling state of the vehicle, a display position of the representative model in the identity display region such that at least a portion of the representative model is maintained in the fixed region of the navigation interface; and updating a display configuration of the electronic map in the navigation interface by shifting the electronic map in a second direction opposite to the first direction based on the display position of the representative model being adjusted to an edge of the identity display region.

* * * * *